United States Patent
Beaty et al.

(10) Patent No.: US 7,104,920 B2
(45) Date of Patent: Sep. 12, 2006

(54) HYBRID VEHICLE POWERTRAIN SYSTEM WITH POWER TAKE-OFF DRIVEN VEHICLE ACCESSORY

(75) Inventors: Kevin D. Beaty, Kalamazoo, MI (US); Thomas R. Bockelmann, Battle Creek, MI (US); Zhanijang Zou, Battle Creek, MI (US); Mark E. Hope, Marshall, MI (US); Xiaosong Kang, Battle Creek, MI (US); Jeffrey L. Carpenter, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 120 days.

(21) Appl. No.: 10/935,496

(22) Filed: Sep. 7, 2004

(65) Prior Publication Data

US 2006/0052215 A1   Mar. 9, 2006

(51) Int. Cl.
*B60W 10/02* (2006.01)
(52) U.S. Cl. .......................................................... 477/5
(58) Field of Classification Search .................. 477/5, 477/3, 6; 475/5, 1, 6; 180/65.4, 65.7
See application file for complete search history.

(56) References Cited

U.S. PATENT DOCUMENTS

| | | | | |
|---|---|---|---|---|
| 5,669,842 A | * | 9/1997 | Schmidt ......................... | 475/5 |
| 6,551,208 B1 | * | 4/2003 | Holmes et al. ................. | 475/5 |
| 6,878,092 B1 | * | 4/2005 | Schustek et al. ............... | 477/3 |

* cited by examiner

*Primary Examiner*—Dirk Wright
(74) *Attorney, Agent, or Firm*—Honigman Miller Schwartz and Cohn LLP

(57) ABSTRACT

A hybrid vehicle powertrain system includes a first prime mover, a first prime mover driven power transmission mechanism having a power take-off adapted to drive a vehicle accessory, and a second prime mover. The second prime mover is operable to drive the power transmission mechanism alone or in combination with the first prime mover to provide power to the power take-off through the power transmission mechanism. The invention further includes methods for operating a hybrid vehicle powertrain system.

27 Claims, 3 Drawing Sheets

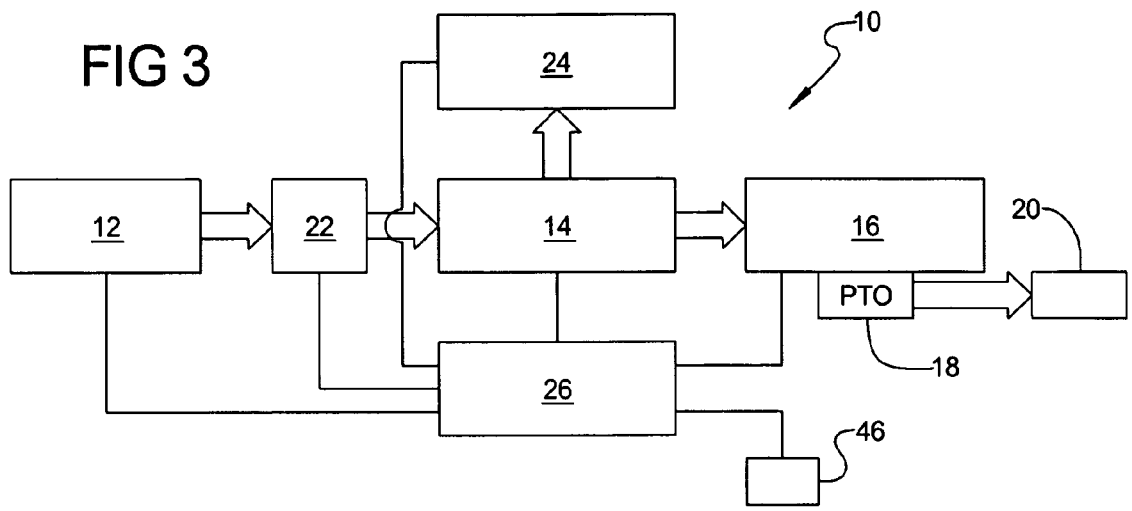
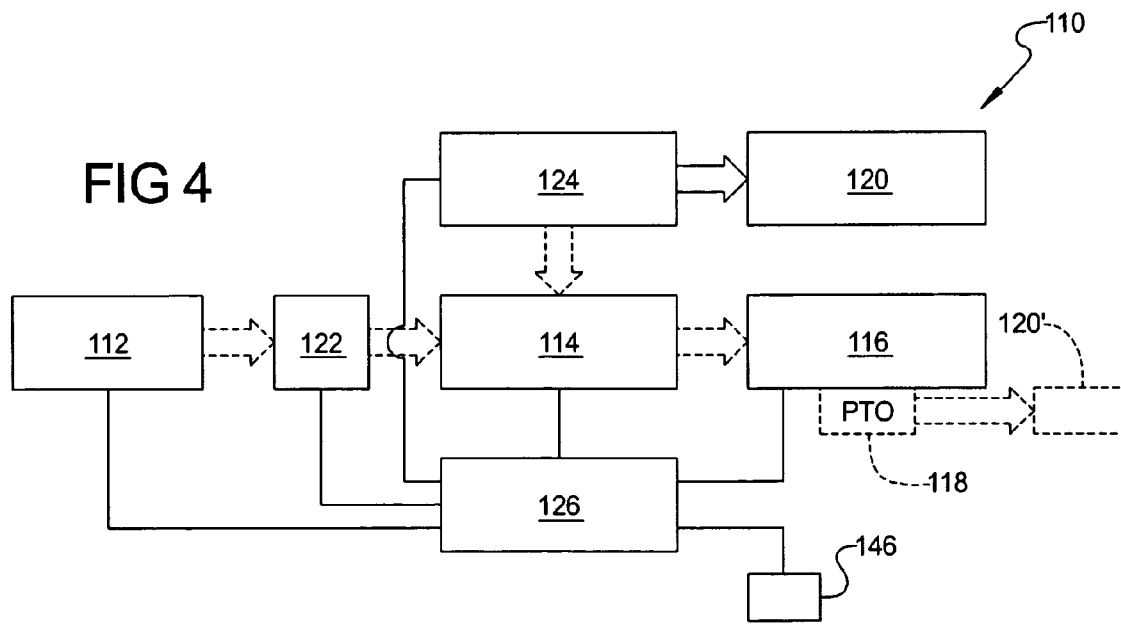

HYBRID VEHICLE POWERTRAIN SYSTEM WITH POWER TAKE-OFF DRIVEN VEHICLE ACCESSORY

This invention was made with Government support under NREL Subcontract No. ZCL-2-32060-01, Prime Contract DE-AC36-99GO10337 awarded by the Department of Energy. The government has certain rights in this invention.

BACKGROUND OF THE INVENTION

1. Field of the Invention

The present invention relates generally to hybrid motor vehicles and, more particularly, to a hybrid powertrain system including a power take-off driven vehicle accessory.

2. Background of the Invention

Mechanical powertrain systems commonly employ a power transmission mechanism driven by a prime mover, such as an internal combustion engine, to power a primary vehicle drive shaft. Equally common are arrangements in which a secondary drive shaft is coupled to the prime mover through some sort of transmission power take-off mechanism, thereby enabling the prime mover to independently power a vehicle accessory in addition to one or more of the vehicle wheels.

Many heavy vehicles in use today (e.g., utility trucks, over-the-road tractors and the like) include at least one power take-off ("PTO"). In utility trucks, for example, a PTO may be used to drive a hydraulic pump in an on-board vehicle hydraulic system. In some configurations, a PTO driven vehicle accessory may be powered while the vehicle is moving. In other configurations, a PTO driven accessory may be powered while the vehicle is stationary and the prime mover is operating. Still others may be driven while the vehicle is either stationary or traveling. Regardless of the type of PTO configuration used, ease of operator use and flexibility of control are important considerations when designing a vehicle's PTO driven accessory system.

Motor vehicle manufacturers are also actively working to develop alternative powertrain systems in an effort to reduce the level of pollutants exhausted into the air by conventional powertrain systems equipped with internal combustion engines. Significant development efforts have been directed to electric and fuel-cell vehicles. Unfortunately, these alternative powertrain systems suffer from several disadvantages and, for all practical purposes, are still under development. However, "hybrid" vehicles that include an internal combustion engine and an electric motor offer a compromise between traditional internal combustion engine powered vehicles and full electric powered vehicles. A hybrid powertrain systems' unique configuration allows the electric motor to provide the sole power needed to operate one or more vehicle functions that include, among other things, independent delivery of motive power to the vehicle wheels through the power transmission mechanism. While hybrid powertrain systems continue to improve in efficiency and seamlessness of operation, a need remains for an improved hybrid powertrain system that allows operation of a power take-off driven vehicle accessory independent of the internal combustion engine.

SUMMARY OF THE INVENTION

A hybrid vehicle powertrain system is provided that includes a first prime mover, a first prime mover driven power transmission mechanism having a power take-off adapted to drive a vehicle accessory, and a second prime mover. The second prime mover is operable to drive the power transmission mechanism alone or in combination with the first prime mover to provide power to the power take-off through the power transmission mechanism.

In another embodiment of the invention, a hybrid vehicle powertrain system is provided that includes a first prime mover, a first prime mover driven power transmission mechanism, a rechargeable energy source, an energy source powered vehicle accessory, and a second prime mover. The second prime mover is operable to drive the power transmission mechanism alone or in combination with the first prime mover. The first prime mover is also operable to drive the second prime mover to recharge the energy source in response to an energy level in the energy source falling below a predetermined level. Methods for operating a hybrid vehicle powertrain system are also provided.

BRIEF DESCRIPTION OF THE DRAWINGS

Embodiments of the invention will now be described, by way of example, with reference to the accompanying drawings, wherein:

FIG. 3 is a schematic illustration of the hybrid vehicle powertrain system of FIG. 1 shown during recharging of an energy source;

FIG. 4 is a schematic illustration of a hybrid vehicle powertrain system according to another embodiment of the present invention.

DETAILED DESCRIPTION

Figure 1:
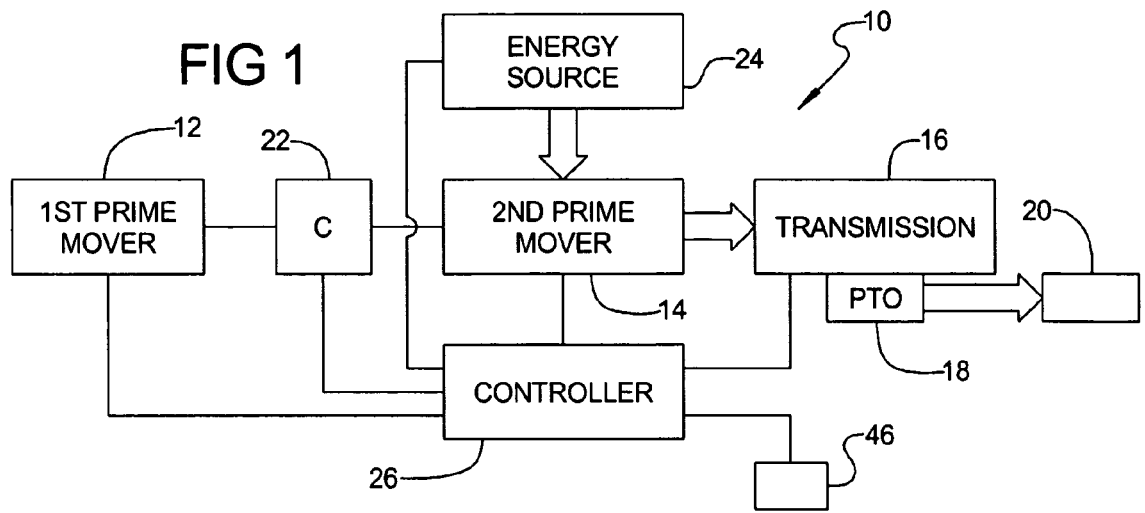
FIG. 1 is a schematic illustration of a hybrid vehicle powertrain system according to an embodiment of the present invention.
Figure 2:
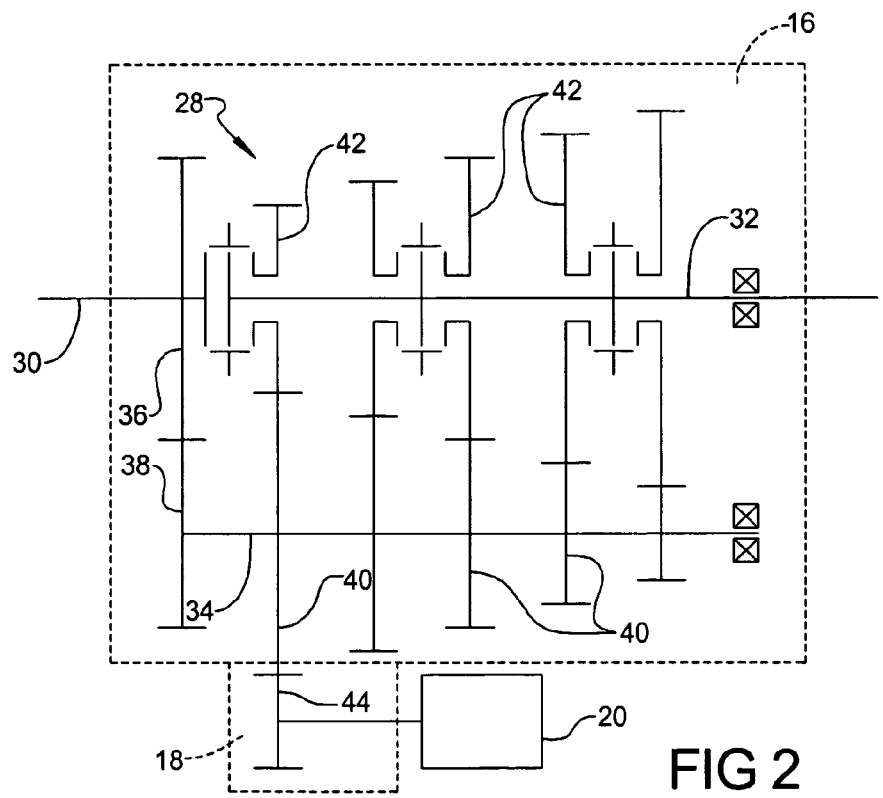
FIG. 2 is a schematic illustration of a power transmission mechanism according to an embodiment of the present invention that is adapted for use in the hybrid powertrain system of FIG. 1.

Referring to FIGS. 1–3, a hybrid vehicle powertrain system 10 according to an embodiment of the present invention is shown. As shown in FIG. 1, hybrid vehicle powertrain system 10 includes a first prime mover 12, such as a diesel or gasoline fueled internal combustion engine, a second prime mover 14, such as an electric or hydraulic motor, and a first prime mover driven power transmission mechanism 16 having a power take-off ("PTO") 18 adapted to drive a vehicle accessory 20. In the illustrated embodiment, hybrid vehicle powertrain system 10 operates as a parallel hybrid powertrain system, permitting second prime mover 14 to drive power transmission mechanism 16 alone or in combination with first prime mover 12 to provide power to PTO 18 through power transmission mechanism 16. An optional clutch 22 may be positioned between first prime mover 12 and power transmission mechanism 16 to selectively transmit power between first prime mover 12 and second prime mover 14 and/or power transmission mechanism 16.

In an embodiment, the energy required to operate second prime mover 14 is supplied by an energy source 24. For example, if second prime mover 14 functions as an electric motor, energy source 24 may include a battery or bank of batteries that store electric power. In another example, if second prime mover 14 functions as a hydraulic motor, energy source 24 may include a source of fluid power, such as a hydraulic accumulator. Operation of hybrid vehicle powertrain system 10 may be controlled by a controller 26, such as a microprocessor-based electronic control unit, which may include one or more sub-controllers for controlling operation of the individual powertrain components.

In an embodiment of the invention, power transmission mechanism 16 includes a multiple-ratio vehicle transmission 28 (see FIG. 2) having a first and/or second prime mover driven input shaft 30, a main shaft 32 and a countershaft 34. An input gear 36 is secured for rotation with input shaft 30 and is meshed with a countershaft-supported headset gear 38 to drive rotation of countershaft 34. Countershaft 34 includes a number of countershaft gears 40 that mesh with corresponding ratio gears 42 rotatably supported on main shaft 32 and selectively engaged therewith to form the various gear ratios in transmission 28.

As also shown in FIG. 2, PTO 18 may include at least one gear 44 meshed with one of countershaft gears 40 such that power is delivered to PTO 18 any time power is delivered to input shaft 30. Among other features, a transmission-integrated PTO allows various powered accessories, such as auxiliary hydraulic pumps, air compressors or other powered equipment, to be mounted to power transmission mechanism 16 and driven by first and/or second prime movers 12, 14 through power transmission mechanism 16. In the configuration shown in FIG. 2, the PTO driven vehicle accessory 20 is directly mounted to the transmission PTO 18 with no exposed moving parts. However, power transmission mechanism 16 and PTO 18 are not intended to be limited to the configuration shown in FIG. 2, which is merely provided as an example of one possible arrangement for transferring power from first and second prime movers 12, 14 to the PTO driven vehicle accessory 20.

In a typical non-hybrid vehicle powertrain system, the internal combustion engine alone is used to drive rotation of the transmission input shaft and, therefore, provides the sole power used to operate the PTO and the PTO driven vehicle accessory. In the present invention, however, second prime mover 14 may be operated alone or in combination with first prime mover 12 to drive rotation of transmission input shaft 30.

To illustrate operation of hybrid powertrain system 10, first prime mover 12 may be configured as an internal combustion engine, second prime mover 14 as an electric motor-generator and energy source 24 as a battery or bank of batteries that store electrical power. While a vehicle employing hybrid powertrain system 10 is parked or in motion, the electric motor may used to drive rotation of transmission input shaft 30, while main clutch 22 is disengaged and the internal combustion engine is turned off. In this mode of operation, the electric motor provides the sole power to rotate transmission input shaft 30 and, accordingly, operate the PTO driven vehicle accessory 20. This feature allows emission-free or reduced-emission operation of the PTO driven vehicle accessory, since the internal combustion engine is idle. For example, in an implementation of the invention that includes a utility truck having a PTO driven hydraulic pump, the hydraulic pump may be operated to energize the vehicle hydraulic system without operating the truck's diesel engine.

In an embodiment, energy source 24 may be recharged or otherwise operated to replace the energy expended to operate second prime mover 14. When the level of energy in energy source 24 is depleted below a predetermined level (e.g., 30% of full charge), clutch 22 may be engaged and second prime mover 14 may be operated as a first prime mover driven generator to recharge energy source 24. In the above-described embodiment of the invention, second prime mover 14 may be operated as a first prime mover driven electrical generator to replace the electrical energy expended form the batteries to operate second prime mover 14 as a motor. While powering second prime mover 14 as a generator, first prime mover 12 may also be used to power PTO 18 via power transmission mechanism 16 (see, e.g., FIG. 3). Once energy source 24 is recharged, clutch 22 may be disengaged, first prime mover 12 turned off, and second prime mover 14 operated as a motor to power PTO 18.

To avoid unnecessary depletion of energy source 24 when operation of the PTO driven vehicle accessory 20 is not required, PTO 18 may be operated "on-demand." For example, in the above described implementation of the invention, the PTO driven hydraulic pump may be deactivated when hydraulic power is not required after a predetermined period of time has elapsed—the deactivation being accomplished by turning off second prime mover 14. The hydraulic pump may be reactivated (or merely activated) in response to an indication that the need for hydraulic power is required or may be imminent.

To facilitate "on-demand" operation of PTO 18, hybrid vehicle powertrain system 10 may include a signaling device 46 to provide a signal to controller 26 indicative of a request to operate the PTO driven vehicle accessory 20. In a particular configuration, signaling device 46 includes a switch activated by movement of shift guards on a typical hydraulic control lever arrangement. The hydraulic pump may be activated when a vehicle operator removes the shift guards to operate the hydraulic control levers. Removing the shift guards will generate a signal that is transmitted to controller 26 to activate second prime mover 14 and/or first prime mover 12 to power the PTO driven hydraulic pump and energize the hydraulic system.

Among other features, hybrid vehicle powertrain system 10 includes a built-in redundancy that will enable operation of the PTO driven vehicle accessory 20 should either first prime mover 12 or second prime mover 14 fail. More particularly, should second prime mover 14 fail, first prime mover 12 may be operated to provide the sole power used to operate PTO 18 and the PTO driven vehicle accessory 20. Alternatively, should first prime mover 12 fail, second prime mover 14 may be operated to provide the sole power used to operate PTO 18 and the PTO driven vehicle accessory 20.

Figure 5:
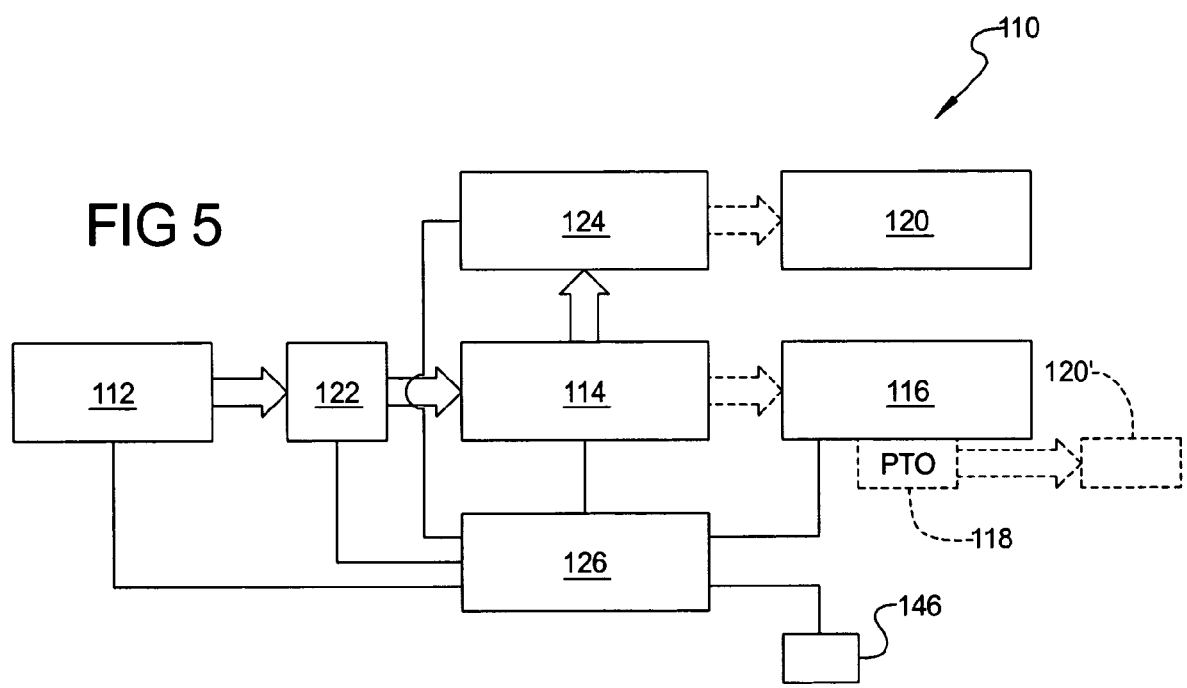
FIG. 5 is a schematic illustration of the hybrid vehicle powertrain system of FIG. 4 shown during recharging of an energy source.

Referring to FIGS. 4 and 5, a hybrid vehicle powertrain system 110 according to another embodiment of the present invention is shown. Powertrain system 110 is similar to powertrain system 10 described above in that it includes a first prime mover 112, a second prime mover 114, a power transmission mechanism 116, a vehicle accessory 120 and an energy source 124. However, unlike powertrain system 110 described above, vehicle accessory 120 is powered by energy source 124 instead of a power transmission PTO. As shown in FIGS. 4 and 5, however, power transmission mechanism may still include a PTO 118 and a PTO driven vehicle accessory 120' that are operable as described above.

In the embodiment shown in FIGS. 4 and 5, energy source 124 may include a battery or bank of batteries that stores electrical power; however, other types of energy, such as the energy contained in a compressed fluid, may be stored in energy source 124 depending on the requirements of vehicle accessory 120. In the case of electrical energy, energy source 124 may be configured to supply energy at various levels, such as 12 VDC or 120 VDC for example, which allows the vehicle manufacturer to select the appropriate power rating for the particular vehicle accessory chosen.

Under normal operating conditions, energy source 124 supplies power to vehicle accessory 120 independent of the operation of first and second prime movers 112, 114. However, should the level of energy in energy source 124 fall below a predetermined level (e.g., 30% of full charge), second prime mover 114 may be operated as a first prime mover driven generator to recharge energy source 124 (see, e.g., FIG. 5). The time to recharge energy source 124 is dependent upon a number of factors, including for example, the type of energy being stored, the capacity of energy source 124 and whether or not vehicle accessory 120 is being operated during the recharging process.

To avoid unnecessary depletion of energy source 124 when operation of vehicle accessory 120 is not required, vehicle accessory 120 may also be operated "on-demand." For example, in the above-described implementation, the electrically driven hydraulic pump may be deactivated when hydraulic power is not required after a predetermined period of time—the deactivation accomplished by turning off the electric motor in the hydraulic pump. The electric motor in the hydraulic pump may be reactivated (or merely activated) in response to an indication that the need for hydraulic power is required or may be imminent. A signaling device 146, similar to that describe above in powertrain system 10, may be used to provide a signal to powertrain controller 126 indicative of a request to activate the vehicle accessory.

Among other features, the present invention provides a vehicle manufacturer with the flexibility to chose between different power sources when designing the hybrid vehicle accessory system and allows reduced-emission or emission-free operation of the vehicle accessory system. Specifically, a power transmission mechanism PTO may be powered by a hybrid drive motor to provide "on-demand" vehicle accessory operation (e.g., hydraulic system operation) without the need to operate the hybrid internal combustion engine. However, if the hybrid drive motor is incapable of powering the PTO driven vehicle accessory (e.g., depletion of energy in the drive motor power source or a drive motor malfunction), the internal combustion engine may used to power the PTO. For those systems that require the flexibility to locate the vehicle accessory away from the power transmission mechanism, the present invention provides a configuration that allows the vehicle accessory to be powered by the same energy source used to power the hybrid drive motor. Regardless of the configuration, the present invention allows reduced-emission or emission-free operation of a vehicle accessory independent of the internal combustion engine.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A hybrid vehicle powertrain system, comprising:
a first prime mover;
a first prime mover driven power transmission mechanism having a power take-off adapted to drive a vehicle accessory;
a second prime mover operable to drive the power transmission mechanism alone or in combination with the first prime mover to provide power to the power take-off through the power transmission mechanism; and
a rechargeable energy source, wherein the second prime mover is operable as a generator or pump and the first prime mover is configured to provide power to the generator or pump to recharge the energy source.

2. The vehicle powertrain system of claim 1, wherein the first prime mover is configured to simultaneously drive the generator or pump to recharge the energy source and provide power to the power take-off through the power transmission mechanism.

3. The vehicle powertrain system of claim 1, wherein the first prime mover and power transmission are configured to provide power to the power take-off in response to an energy level in the energy source falling below a predetermined level.

4. The vehicle powertrain system of claim 1 further including a clutch positioned between the first prime mover and the power transmission mechanism.

5. The vehicle powertrain system of claim 4, wherein the clutch is adapted to be disengaged when the second prime mover is providing power to the power take-off.

6. The vehicle powertrain system of claim 1, wherein the second prime mover is selectively operable to provide power to the power take-off through the power transmission mechanism.

7. The vehicle powertrain system of claim 1, wherein the vehicle accessory is a hydraulic system.

8. The vehicle powertrain system of claim 1 further including a controller for controlling operation of the vehicle powertrain system and a signaling device operable to provide a signal to the controller authorizing operation of the power take-off driven vehicle accessory and a corresponding activation of the second prime mover to provide power to the power take-off through the power transmission system.

9. A hybrid vehicle powertrain system, comprising:
a first prime mover;
a first prime mover driven power transmission mechanism;
a rechargeable energy source;
an energy source powered second prime mover operable to drive the power transmission mechanism alone or in combination with the first prime mover, the first prime mover operable to drive the second prime mover to recharge the energy source in response to an energy level in the energy source falling below a predetermined level; and
an energy source powered vehicle accessory.

10. The vehicle powertrain system of claim 9, wherein the power transmission mechanism includes a power take-off adapted to drive a vehicle accessory.

11. The vehicle powertrain system of claim 10, wherein the first prime mover, the second prime mover and the power transmission mechanism are configured to provide power to the power take-off.

12. The vehicle powertrain system of claim 11, wherein the first prime mover is configured to simultaneously drive the second prime mover to recharge the energy source and provide power to the power take-off.

13. The vehicle powertrain system of claim 10 further including a clutch positioned between the first prime mover and the power transmission mechanism.

14. The vehicle powertrain system of claim 13, wherein the clutch is adapted to be disengaged when the second prime mover is providing power to the power take-off.

15. The vehicle powertrain system of claim 10 further including a controller for controlling operation of the vehicle powertrain system and a signaling device operable to provide a signal to the controller authorizing operation of the power take-off vehicle accessory and a corresponding activation of the second prime mover to provide power to the power take-off through the power transmission system.

16. The vehicle powertrain system of claim 9, wherein the energy source powered vehicle accessory is a hydraulic system.

17. The vehicle powertrain system of claim 9 further including a controller for controlling operation of the vehicle powertrain system and a signaling device operable to provide a signal to the controller authorizing operation of the energy source powered vehicle accessory.

18. A method of operating a hybrid vehicle powertrain system, comprising:
    providing a first prime mover, a first prime mover driven power transmission mechanism having a power take-off adapted to drive a vehicle accessory, and a second prime mover operable to drive the power transmission mechanism alone or in combination with the first prime mover;
    operating the second prime mover to provide power to the power take-off through the power transmission mechanism; and
    providing a rechargeable energy source and operating the second prime mover as a generator or pump to recharge the energy source.

19. The method of claim 18 further including the step of operating the first prime mover to simultaneously drive the second prime mover to recharge the energy source and provide power to the power take-off through the power transmission mechanism.

20. The method of claim 18 further including the step of operating the first prime mover to provide power to the power take-off through the power transmission mechanism in response to an energy level in the energy source falling below a predetermined level.

21. The method of claim 18 further including the step of providing a clutch between the first prime mover and the power transmission mechanism and disengaging the clutch when the second prime mover is providing power to the power take-off.

22. The method of claim 18 wherein the step of operating the second prime mover to provide power to the power take-off through the power transmission mechanism further includes operating the second prime mover only when operation of the vehicle accessory is required.

23. A method of operating a hybrid vehicle powertrain system, comprising:
    providing a first prime mover, a first prime mover driven power transmission mechanism, a rechargeable energy source, a second prime mover operable to drive the power transmission mechanism alone or in combination with the first prime mover and further operable to recharge the energy source, and an energy source powered vehicle accessory;
    operating the vehicle accessory using energy from the energy source; and operating the second prime mover to recharge the energy source in response to an energy level in the energy source falling below a predetermined level.

24. The method of claim 23 further including the steps of providing a power transmission mechanism power take-off adapted to drive a second vehicle accessory and operating the second prime mover to provide power to the power take-off through the power transmission mechanism.

25. The method of claim 24 further including the step of operating the first prime mover to provide power to the power take-off through the power transmission mechanism in response to an energy level in the energy source falling below a predetermined level.

26. The method of claim 24 further including the steps of providing a clutch between the first prime mover and the power transmission mechanism and disengaging the clutch when the second prime mover is providing power to the power take-off.

27. The method of claim 23 wherein the step of providing energy from the energy source to the vehicle accessory further includes deactivating the vehicle accessory when operation of the vehicle accessory is not required.

* * * * *